Jan. 18, 1966  L. V. CHABALA  3,229,848
PRESSURE RELIEF MEANS
Filed March 4, 1965  3 Sheets-Sheet 3
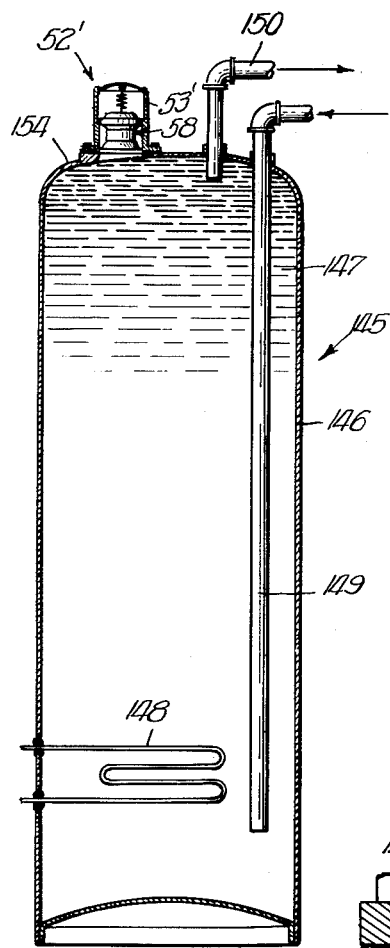
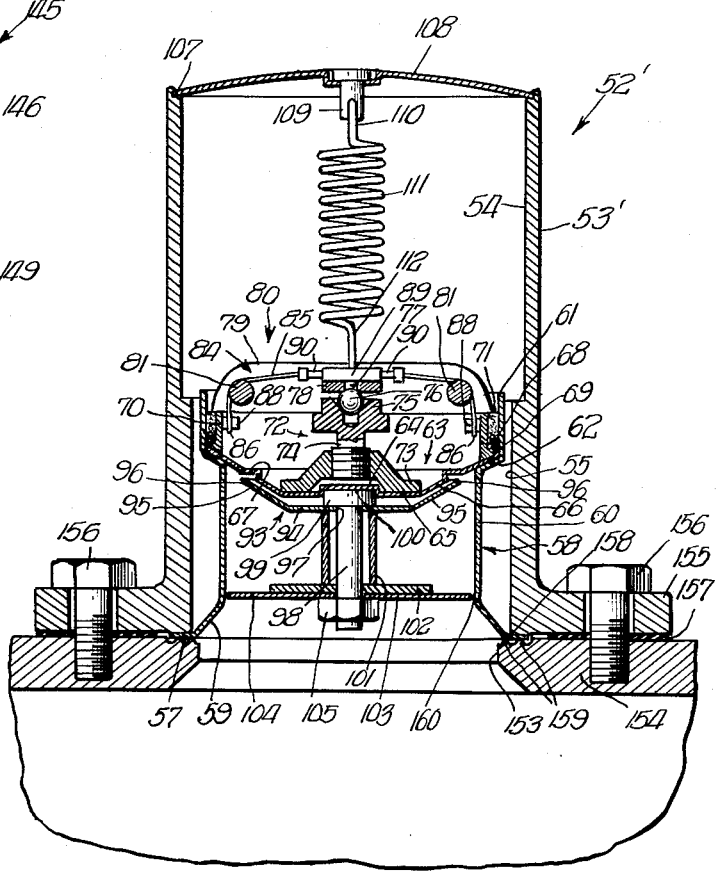

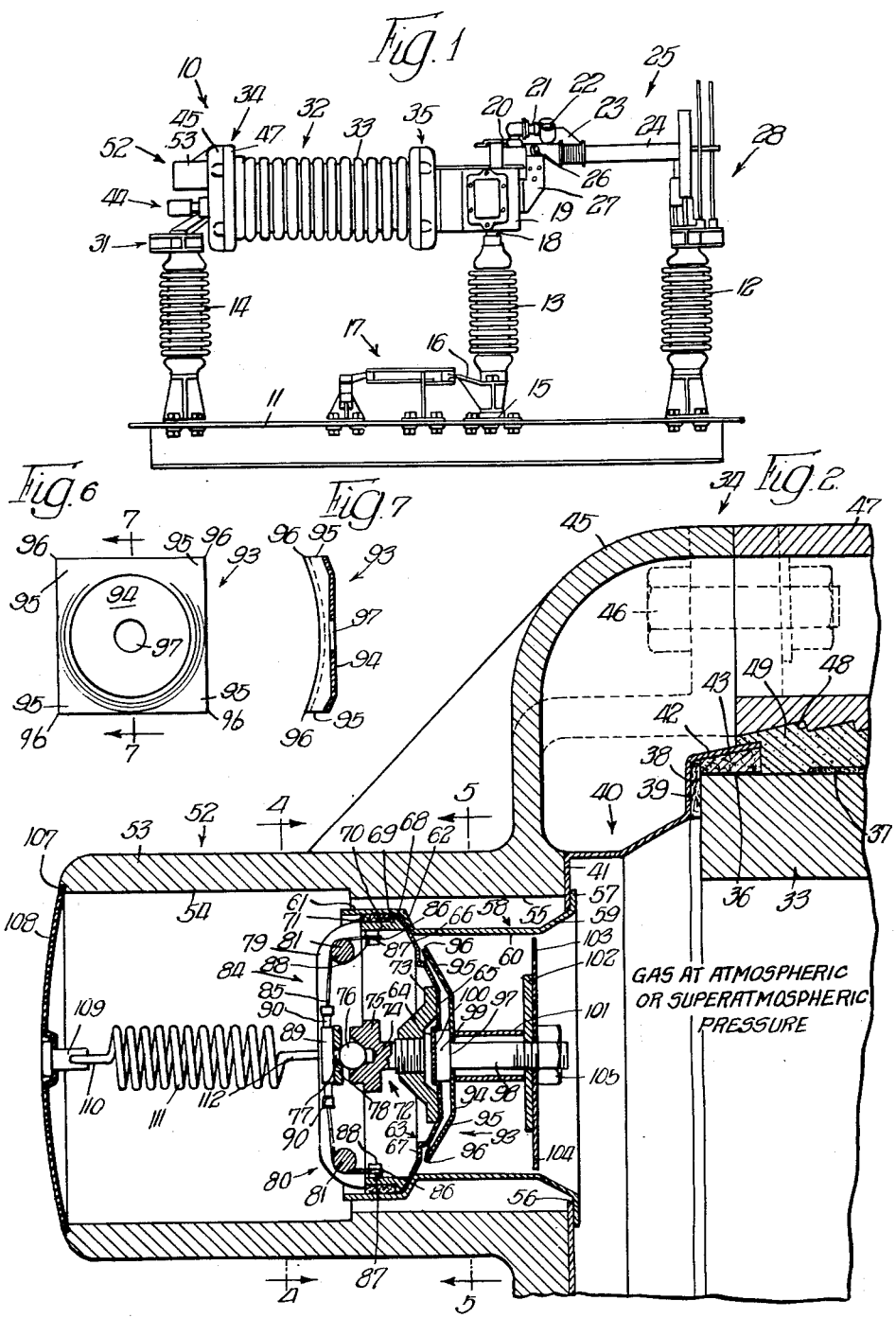

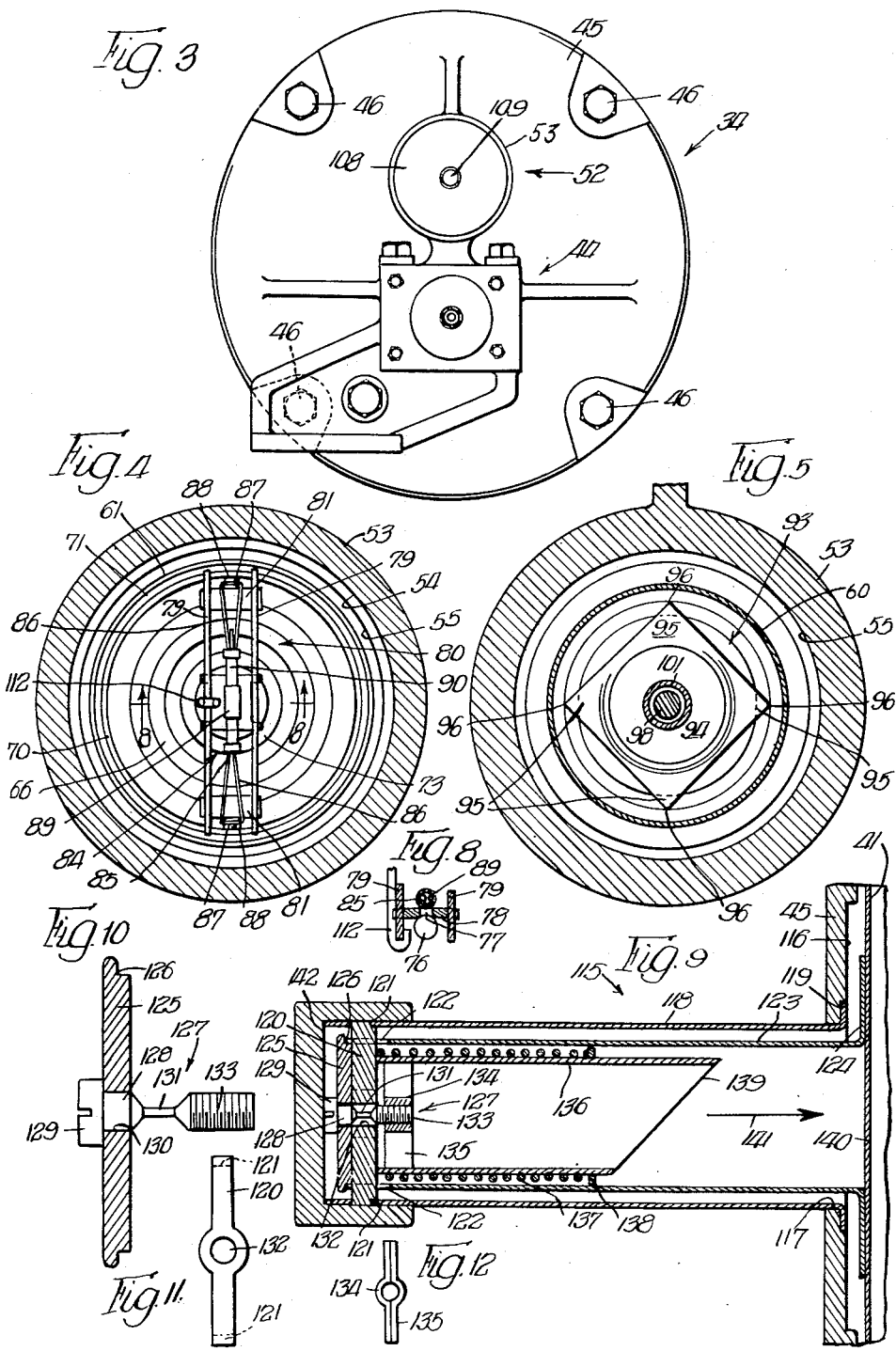

United States Patent Office 3,229,848
Patented Jan. 18, 1966

3,229,848
PRESSURE RELIEF MEANS
Leonard V. Chabala, Maywood, Ill., assignor to S & C Electric Company, Chicago, Ill., a corporation of Delaware
Filed Mar. 4, 1965, Ser. No. 437,207
9 Claims. (Cl. 220—89)

This application is a continuation-in-part of application Serial No. 350,189, filed March 9, 1964, now abandoned, and constitutes an improvement over the construction shown in Goldbach et al. Patent No. 3,077,527, issued February 12, 1963. This invention relates to fluid pressure relief means for high voltage alternating current circuit interrupters in which an arc extinguishing gas under superatmospheric pressure is employed for assisting in circuit interruption and preventing restriking of the arc once it has been extinguished. It also relates to fluid pressure relief means for water heaters, boilers, cookers, chemical processing vessels and the like.

The circuit interrupter shown in the above patent employs a porcelain housing for containing the arc extinguishing gas under superatmospheric pressure. The circuit is opened within this housing by separable contacts and the arc or arcs drawn therebetween are extinguished. Under certain circumstances pressure within the porcelain housing, which is relatively frangible, may be sufficient to cause it to be fractured unless provision is made for rapidly relieving the excess pressure.

Fluid pressure devices, such as domestic and commercial water heaters, boilers, cookers and chemical processing vessels commonly employ mechanisms for relieving excess pressure. These mechanisms utilize rupture discs, safety valves and the like which may be uncertain in operation, are subject to deterioration and may not relieve the excess fluid pressure as rapidly as desired.

Accordingly, among the objects of this invention are: To provide for quickly venting pressure vessels, such as the porcelain housing and fluid pressure devices above referred to, and for allowing rapid escape of the fluid, gas or liquid, therein to the atmosphere when the internal pressure of the fluid reaches a predetermined value; to construct the pressure release mechanism so as to be: hermetically sealed, relatively immune to corrosion damage, releasable within a small range of pressure variation, capable of undergoing repetitive pressure changes induced by change in temperature without fatigue failure and without changing the range of release pressure, to have a response pressure and vent area substantially independent of rate of fluid pressure increase, and capable of withstanding atmospheric pressure when the pressure vessel is evacuated during certain asembly operations; to control the release mechanism by a tension element that is severed when a predetermined pressure occurs in the pressure vessel; and to provide for venting the pressure vessel at a pressure relatively close to the pressure to which it is likely to be subjected under normal operating conditions.

In the drawings:

FIG. 1 is a view, in side elevation, of switch means having pressure relief means embodying the present invention.

FIG. 2 shows, at an enlarged scale, a partial vertical cross sectional view of the left end of the current interrupter shown in FIG. 1.

FIG. 3 is a view in end elevation and looking from the left end of the current interrupter shown in FIG. 1.

FIG. 4 is a vertical sectional view taken generally along the line 4—4 of FIG. 2.

FIG. 5 is a vertical sectional view taken generally along the line 5—5 of FIG. 2.

FIG. 6 is an elevational view of the diaphragm piercing means or cutter shown in FIG. 2.

FIG. 7 is a vertical sectional view taken generally along the line 7—7 of FIG. 6.

FIG. 8 is a sectional view taken generally along the line 8—8 of FIG. 4.

FIG. 9 is a vertical sectional view showing a modified form of the pressure relief means.

FIG. 10 is a view, at an enlarged scale and in cross section, of the cap and strain element means shown in FIG. 9.

FIG. 11 is a plan view of one of the bridges shown in FIG. 9.

FIG. 12 is a plan view of another of the bridges shown in FIG. 9.

FIG. 13 is a vertical sectional view of a typical water heater with which the present invention can be employed.

FIG. 14 is a vertical sectional view, at an enlarged scale, of the pressure relief device shown in FIG. 13 and illustrates how it can be applied to a fluid pressure device such as there shown.

Referring now particularly to FIG. 1 of the drawings, it will be observed that the reference character 10 designates, generally, switch means having pressure relief means in which the present invention is embodied. The switch means 10 includes a base, indicated generally at 11, that may be formed of a pair of rolled steel channels suitably secured together. Mounted on the base 11 are a first insulator 12, a second insulator 13 which is rotatable, and a third insulator 14. The second insulator 13 is rotatably mounted on a bearing 15 that is carried by the base 11 and it has an arm 16 extending therefrom for connection to a suitable operating linkage that is indicated, generally, at 17. Extending upwardly from and rotatable with the second insulator 13 is a shaft 18. The shaft 18 extends through and is rotatably mounted on a mechanism housing 19 the details of construction of which are set forth in Gussow et al. Patent No. 3,030,-481, issued April 17, 1962, together with the operating mechanism therein which is controlled by the shaft 18. For present purposes it is pointed out that the shaft 18 extends through the mechanism housing 19 and carries at its upper end a switch crank 20 which is rotatable therewith. The switch crank 20 is pivotally connected to a link 21 that is pivoted at 22 to an arm 23 which extends from a switch blade 24 that forms a part of a disconnecting switch which is indicated, generally, at 25. The switch blade 24 is pivoted at 26 on a bracket 27 which is carried by one wall of the mechanism housing 19. At its swinging end the switch blade 24 is arranged to move into and out of high pressure contact engagement with a line contact member, shown generally at 28, which is carried by the first insulator 12. It will be understood that, on rotation of the second insulator 13 by the operating linkage 17, a corresponding rotation of the switch crank 20 is effected for swinging the switch blade 24 out of or into high pressure contact engagement with the line contact member 28, depending upon the direction of rotation. It is desirable that the switch blade 24 be opened only after the circuit has been opened previously by some other means. The reason for this is to prevent the drawing of an arc between the swinging end of the switch blade 24 and the line contact member 28 when the circuit is interrupted under load which might result in damage to these parts or the creation of a fault by arcing over to an adjacent phase or to ground. For this purpose there is mounted between the mechanism housing 19 and a line terminal 31, which is carried by the third insulator 14, a current interrupter that is indicated, generally, at 32. Separable contact means are provided in the current interrupter 32 which are operated by the mechanism within the mechanism housing 19 under the control of the shaft 18. The current interrupter 32 is provided with an insulating housing 33 that preferably is a one piece hollow porcelain housing having a cylindrical interior and exterior corrugations to increase its flashover value between the ends. At the ends of the housing 33 there are provided terminals that are indicated, generally, at 34 and 35.

Referring now particularly to FIG. 2 of the drawing, since the insulator housing 33 is intended to contain a filling of a fluid in the form of an arc extinguishing gas at superatmospheric pressure, provision is made for hermetically sealing the ends thereof. Around the extreme end of each end of the insulating housing 33 there is provided an external metallic band, one of which is indicated at 36 and preferably formed of platinum which facilitates soldering thereto. In addition at locations spaced slightly from the extreme ends of the insulating housing 33 there are provided sand bands one of which is shown at 37. They facilitate cementing of the terminals 34 and 35 to the insulating housing 33. In order to prevent the solder from flowing inwardly of the end of the insulating housing 33, an annular dam 38 is employed for engagement with the adjacent end of the housing 33 on one side and for engagement on the other side with a pan shaped diaphragm 40 that is formed of relatively thin copper. The diaphragm 40 has a flat bottom 41 and an outflared rim 42 which overlies the platinum band 36. A filling of molten solder 43 is provided between the platinum band 36 and the outflared rim 42 to seal hermetically the diaphragm 40 to this end of the insulating housing 33.

As described in the patent above noted means are provided for indicating loss of gas pressure. Such means is indicated, generally, at 44 in FIG. 1. The loss of gas pressure indicator 44 is mounted on a terminal end adapter 45 which forms a part of the terminal 34. The terminal end adapter 45 is secured by bolts 46 to an adapter ring 47 which, as shown in FIG. 2, has a corrugated inner surface 48 for receiving between it and the sand band 37 a filling 49 of Portland cement.

For the reasons outlined above it is desirable to provide for quickly venting the interior of the insulating housing 33 to the atmosphere in the event that a fluid pressure should be generated therein sufficient to fracture the insulating housing 33. For this purpose pressure relief means, shown generally at 52, is provided. As shown in FIG. 2 the pressure relief means 52 includes discharge tube means a part of which comprises an outer discharge tube 53 that is formed integrally with the terminal end adapter 45. The outer discharge tube 53 is located above the loss of gas pressure indicated at 44, as seen in FIGS. 1 and 3, and it is provided with a large diameter outer section 54 and a smaller diameter inner section 55. An opening 56 is formed in the flat bottom 41 of the pan shaped diaphragm 40 to place the outer discharge tube 53 in communication with the interior of the insulating housing 33. Surrounding the opening 56 in the flat bottom 41 is an annular flange 57 that preferably is secured in position by brazing. The annular flange 57 forms an integral part of an inner discharge tube or tubular holder 58 which forms a part of the discharge tube means and is telescoped, as shown, within the smaller diameter inner section 55 of the outer discharge tube 53. It has a frusto-conical entrance section 59 that extends from the annular flange 57 to a cylindrical intermediate section 60. Preferably the inner discharge tube or tubular holder 58 is formed of copper and terminates in a relatively large diameter outer exhaust section 61 that is connected to the intermediate section 60 by a frusto-conical connecting section 62. The opening through the inner discharge tube or tubular holder 58 is closed by a rupturable diaphragm that is indicated, generally, at 63. The rupturable diaphragm 63, which is generally frusto-conical in configuration with the convex side facing toward the interior of the insulating housing 33, is formed from a disc of soft annealed sheet copper having a thickness of the order of .008". It is deformed by suitable means to the configuration shown so as to have an indented central portion 64 which is surrounded by a flat annular portion 65. It has an intermediate frusto-conical portion 66 with an annular section 67 therein that is located in a plane that is perpendicular to the longitudinal axis of the inner discharge tube or tubular holder 58. The periphery 68 of the rupturable diaphragm 63 is formed over an annular rim 69 of a brass support ring 70 which is located within the relatively large diameter outer exhaust section 61. The annular rim 69, periphery 68 of the rupturable diaphragm 63 and the inner surface of the large diameter outer exhaust section 61 are secured together by a filling of molten silver solder 71. This construction provides a hermetic seal for the discharge end of the inner discharge tube or tubular holder 58. By employing the frusto-conical configuration for the rupturable diaphragm 63 and positioning the convex side toward the interior of the insulating housing 33, it is possible to employ the relatively thin material, as noted, and still withstand without difficulty the normal fluid pressure within the insulating housing 33. When this fluid pressure increases substantially and to a point where it is desirable to quickly vent the housing 33, the rupturable diaphragm 63 everts with a snap action and is quickly ruptured in the manner herein described.

In order to hold the rupturable diaphragm 63 in the position shown in FIG. 2 for normal operation, force transmitting means, shown generally at 72, are provided. Force transmitting means 72 include a brass pressure plate 73 that overlies the outer side of the flat annular portion 65. A brass jack screw 74 is threaded into the pressure plate 73 and is provided at the outer end with a socket head 75 in which a stainless steel ball 76 is positioned. The opposite side of the ball 76 is located in a central opening 77 of a brass adjusting plate 78 which is positioned between and held by side plates 79 of stainless steel that form a bridge, shown generally at 80. The side plates 79 of the bridge 80 are held in rigid spaced apart relation by transversely extending end members or tie pins 81 that may be formed of bronze. The force transmitting means 72 also include strain element means shown, generally, at 84 in FIGS. 2 and 4. The strain element means 84 include a strain wire 85, preferably formed of a corrosion-resistant alloy such as stainless steel. For illustrative purposes it is pointed out that the strain wire 85 may have a diameter of .013". The strain wire 85 is formed with end loops 86 that extend over the end members or tie pins 81 and are located in annular grooves 87 that are formed in anchor members 88 that extend radially inwardly from opposite sides of the support ring 70. The strain wire 85 is preformed with the end loops 86 with the two end portions and the central portion located within a tubular connecting member 89 of copper that is deformed, as indicated at 90, near each end to hold the sections of the strain wire 85 extending therethrough rigidly in position. After the strain element means 84 is assembled with the bridge 80 and the end loops 86 are positioned over the anchor members 88, the jack screw 74 is rotated until a predetermined tension is applied to the strain wire 85. Since the adjusting plate 78 is mounted between the side plates 79 with some lost motion, such lost motion is utilized to take up the slack in the strain element means when the jack screw 74 is extended. After this occurs, further motion is applied to the bridge 80. Thus the tension force applied by the strain element means 84 is transmitted from the support ring 70 or the large diameter outer exhaust section 61 of the inner discharge tube or tubular holder 58 through the bridge 80 to the adjusting plate 78 and thence through the ball 76 to the socket head 75 of the jack screw 74. The compressive force thus applied to the jack screw 74 is applied thereto through the pressure plate 73 from the flat annular portion 65 of the rupturable diaphragm 63. By employing the jack screw 74 and ball 76 it is possible to accommodate some variation in manufacturing tolerances without in any way interfering with the pressure at which the diaphragm 63 is ruptured.

It is desirable that, once the rupturing pressure for the diaphragm 63 is reached, it be ruptured and a relatively large area opening provided therethrough for the purpose of quickly relieving the pressure within the insulating housing 33. For this purpose a diaphragm piercing means or cutter 93 is employed. It is shown in more detail in FIGS. 6 and 7. Preferably the diaphragm piercing means or cutter 93 is formed of cold rolled sheet steel with a flat central portion 94 and laterally extending corner cutting portions 95 which conform generally to the frusto-conical configuration of the intermediate portion 66 of the rupturable diaphragm 63 with the tips 96 thereof registering with the outermost portion of the annular section 67. The flat central portion 94 is apertured at 97 for receiving a bolt 98 which has a head 99 that is secured, as by brazing, at 100 to the inner side of the indented central portion 64 of the rupturable diaphragm 63. Surrounding the bolt 98 is a tubular spacer 101 that extends between the piercing means or cutter 93 and a back up disc 102. The back up disc 102 is relatively thick and overlies the central portion of a piston 103 that preferably is formed of copper strip material having a thickness of .016″ so that the annular outer portion 104 can be deformed readily to permit its passage through the opening in the rupturable diaphragm 63 that is made when the diaphargm piercing means or cutter 93 moves therethrough. A nut 105 at the inner end of the bolt 98 serves to hold the assembly in position.

At its outer end the large diameter outer section 54 of the outer discharge tube 53 is provided with an annular groove 107 for receiving the periphery of an aluminum vent cap 108 that is concave outward and is provided with a central hold down pin 109 therethrough to which one end 110 of a coil tension spring 111 it attached. The inner end 112 of the coil tension spring 111, as shown in FIG. 8, is formed so as to hook over one of the side plates 79 of the bridge 80.

Under normal operating conditions the fluid pressure at the left side of the piston 103 is equalized with the pressure in the insulating housing 33. This pressure acts against the rupturable diaphragm 63 with a force that is equal to the unit pressure times the cross sectional area of the cylindrical intermediate section 60. In part this force is resisted by that portion of the rupturable diaphragm 63 adjacent the support ring 70 with the major portion being resisted by strain element means 84 including the strain wire 85. Since the strain wire 85 is relatively short, the movement of the force transmitting means 72 is relatively negligible. The strain wire 85 preferably has an elongation of approximately 3% and it will be understood that, at a given internal fluid pressure in the insulating housing 33 and applied to the rupturable diaphragm 63, the strain wire 85 is severed. When this takes place at either end of the bridge 80, the parts previously assembled therewith are freed and the diaphragm 63 everts. Since the head 99 of the bolt 98 is secured to the indented central portion 64 of the diaphragm 63, the diaphragm piercing means or cutter 93 is moved therewith and the corner portions 95 pierce the frusto-conical portion 66 to form four triangular holes with the tips 96 entering along the outer periphery of the annular section 67. As soon as the fluid or gas begins to vent through the four openings formed by the corner cutting portions 95, an increasing pressure differential appears on opposite sides of the piston 103 with the result that a greater pressure is applied to the inner side which assists in driving the piercing means or cutter 93 outwardly. The piston 103 is particularly useful to complete the passage of the piercing means or cutter 93 through the rupturable diaphragm 63 at relatively low venting fluid pressures. Since the piston 103 is formed of relatively thin material the outer portion 104 is readily deformed and passes through the rectangular opening formed in the rupturable diaphragm 63 by the passage therethrough of the piercing means or cutter 93. The fluid from the insulating housing 33 flows through the vent thus formed in the rupturable diaphragm 63 and the released separated parts are expelled outwardly through the outer discharge tube 53. Since the bridge 80 no longer is restrained by the strain element means 84, the tension spring 111 is released and it together with the vent cap 108 are blown outwardly by the outpouring fluid.

It will be observed that the piston 103 is positioned between the rupturable diaphragm 63 and the interior of the insulating housing 33. In this position the piston 103 shields the rupturable diaphragm 63 from the heat of any arcs that are drawn within the insulating housing 33 which are incident to the normal operation of the current interrupter 32. This is desirable since the rupturable diaphragm 63 is formed of relatively thin material and could be adversely affected, if it were directly subjected to the heat of the arc.

Experience indicates that the shape of the rupturable diaphragm 63 as shown in FIG. 2 is effective, not only for withstanding the normal outward pressure incident to the normal superatmospheric pressure of the fluid or gas in the insulating housing 33, but also it is capable of withstanding external fluid or atmospheric pressure incident to the drawing of a vacuum within the insulating housing 33 during a part of the manufacturing operations for the current interrupter 32. With the particular construction shown, on eversion of the rupturable diaphragm 63, sufficient movement of the piercing means or cutter 93 is permitted to cause the formation of the four vent openings in the manner described.

Referring now particularly to FIG. 9 of the drawings, it will be observed that the reference character 115 shows pressure relief means of somewhat different construction than the pressure relief means 52. Here it will be observed that the terminal end adapter 45 has a counterbored section 116 and is provided with an opening 117. The flat bottom 41 of the pan-shaped diaphragm 40 normally is unperforated and extends over the entire counterbored section 116 and is in spaced relation thereto. The arrangement is such that, under normal operating conditions, the flat bottom 41 remains in the spaced relationship shown in FIG. 9. However, on increase in fluid or gas pressure within the insulating housing 33 to a predetermined pressure, the flat bottom 41 is bulged outwardly and into the counterbored section 116. Advantage is taken of this movement to rupture a portion of the flat bottom 41 in order to permit the fluid or gas to escape quickly through discharge tube means which include a tubular support 118 that is arranged to communicate with the interior of the housing 33 when the flat bottom 41 is ruptured. The tubular support 118 is provided with an integral flanged inner end 119 that is suitably secured to the terminal end adapter 45. At its outer end the tubular support 118 is provided with a transversely extending bridge 120 which is shown in more detail in FIG. 11. The notched ends 121 of the bridge 120 extend through suitable openings in the outer end of the tubular support 118 and thus it is held rigidly in position not only against transverse movement but also against movement outwardly on venting of the interior of the insulating housing 33. The ends of the bridge 120 extend through slots 122 that are formed in the outer end of a reaction tube 123 which has an annular integral flange 124 at its inner end that rests against the outer side of the flat bottom 41. At the outer end of the reaction tube 123 a cap 125 is positioned which has an annular groove 126, FIG. 10, to facilitate fitting into the outer end of the reaction tube 123. The cap 125 is connected by strain element means, shown generally at 127, to the outer end of the tubular support 118 in such manner that the reaction tube 123 is in compression while the tubular support 118 is in tension. The strain element means 127 include a screw or rod-like member 128 which is provided with a head 129 that overlies the outer side of the cap 125. The body of the screw or rod-like member 128 extends through a central aperture 130 in the cap 125 and is provided with a reduced diameter strain responsive section 131 where it passes through an opening 132 in the bridge 120. The threaded portion 133 of the screw or rod-like member 128 is screwed into a nut 134 that is secured to a bridge 135, FIG. 12, the ends of which are secured, as by brazing, to the outer end of diaphragm piercing means or tubular cutter 136. The outer end of the diaphragm piercing means or tubular cutter 136 bears against the inner side of the bridge 120 and the screw or rod-like member 128 is tightened in order to place the tubular support 118 in tension and the reaction tube 123 in compression as indicated above. A compression spring 137 surrounds the diaphragm piercing means or tubular cutter 136 and at the outer end reacts against the inner side of the bridge 120 while its inner end reacts against an annular flange 138 that is carried by the diaphragm piercing means or tubular cutter 136 the inner end 139 of which is formed on a bias so as to facilitate perforation of the section 140 of the flat bottom 41 on release or rupture of the reduced diameter strain responsive section 131. When this takes place the spring 137, that was previously restrained, is released and it moves the diaphragm piercing means or tubular cutter 136 in the direction indicated by arrow 141 to rupture the section 140 and ordinarily to cut a circular section therefrom which permits the rapid escape of fluid or gas from the inside of the insulating housing 33. A readily removable weather cap 142 closes the outer end of the tubular support 118.

It will be understood that the cross section of the reduced diameter strain responsive section 131 of the screw or rod-like member 128 is so chosen as to be capable of withstanding the tension force incident to the normal fluid pressure within the insulating housing 33. Upon the occurrence of a predetermined fluid pressure applied against the inner side of the flat bottom 41 of the pan shaped diaphragm 40, when the construction shown in FIG. 9 is employed, that portion overlying the counterbored section 116 in the terminal end adapted 45 moves outwardly and carries with it the cap 125. This movement is permitted because of the slots 122 while the bridge 120 is held stationary by the tubular support 118. The reduced diameter strain responsive section 131 is elongated and severed under these predetermined conditions. The spring 137 no longer is restrained. It moves the diaphragm piercing means or tubular cutter 135 in the direction of the arrow 141 and its inner end 139 pierces the section 140. The excessive pressure within the insulating housing 33 then is relieved by flow through the opening thus formed and outwardly through the reaction tube 123 past the bridges 135 and 120. The cap 125 is blown off and likewise the weather cap 142 is blown off with the result that the interior of the insulating housing 33 communicates with and vents to the atmosphere through the discharge tube means comprising the tubular support 118 and the reaction tube 123.

One important advantage of the construction shown in FIG. 9 is that it is unnecessary to perforate the flat bottom 41 of the pan-shaped diaphragm 40 to effect operation of the fluid pressure relief means 115. Moreover, the flat bottom 41 is of sufficient strength to resist negative fluid pressure applied thereto when a vacuum is formed within the insulating housing 33 during the manufacturing operations.

While the insulating housing 33 is described as being filled with an arc extinguishing gas at superatmospheric pressure, it may be arranged to operate at atmospheric pressure. Also there is the possibility of gas leakage resulting in reduction of internal pressure to atmospheric pressure. However, there may be a sudden increase in pressure which should be promptly relieved to avoid fracture of the porcelain housing 33.

Either of the pressure relief devices disclosed herein is capable of venting the insulating housing 33 when it is subjected to a fluid pressure slightly higher than the fluid pressure to which it is normally subjected. For illustrative purposes it is pointed out that the normal fluid or gas pressure within the housing 33 of the current interrupter is three atmospheres absolute. Transient pressures experienced when interrupting fault current in hot weather may reach four atmospheres absolute. The pressure relief devices are arranged to operate when the pressure in the housing reaches five atmospheres absolute. This is substantially less than the pressure required to fracture the porcelain housing 33 which ordinarily is capable of withstanding fluid pressures of the order of forty atmospheres absolute except when it is subjected to the effects of thermal shock caused by continuous arcing. This is in excess of the pressure required to cause the terminals 34 and 35 to be blown off which is of the order of thirty atmospheres.

Provision is made for puncturing either the diaphragm 63 or the flat bottom 41 as described herein. One reason for this action is due to the fact that the diaphragm 63 and the flat bottom 41 are relatively thick as compared to the thickness of a diaphragm of equal diameter which could be expected to burst at the desired venting pressure. An important advantage of the use of the relatively thick diaphragm and the puncturing device is that it is rugged and has relatively high corrosion resistance.

The present invention can be employed where the substance under pressure is a liquid, vapor over or with a liquid, or a liquid which may flash into vapor when pressure is reduced. All of these applications involve fluid pressure in excess of atmospheric pressure. For illustrative purposes pressure relief means 52' is shown in FIGS. 13 and 14 in conjunction with a domestic water heater indicated at 145. The pressure relief means 52' is essentially the same in construction as the pressure relief means 52 described above. It is modified, as will be described, for application to a metallic tank 146 which forms a part of the domestic water heater 145.

As shown the tank 146 contains a filling of water 147 that is maintained at an elevated temperature by an immersion type electric heater element 148 that is arranged to be thermostatically controlled for maintaining a predetermined temperature of the water 147. The tank 146 is provided with a cold water inlet pipe 149 that discharges near the bottom and a hot water outlet pipe 150 the intake end of which is near the top of the tank 146.

FIG. 14 shows the details of construction of the pressure relief means 52'. Insofar as the elements thereof are the same as for the pressure relief means 52, previously described, the same reference characters are applied and the description of them will not be repeated except where necessary to provide a complete understanding of the construction here shown.

The pressure relief means 52' includes discharge tube means in the form of an outer discharge tube 53' which corresponds to the outer discharge tube 53. The discharge tube means 53' is in alignment with an opening 153 in the top wall 154 of the tank 146. For simplicity in construction of a tank 146, the discharge tube means 53 is not made integral with the top wall 154. Instead a radial flange 155 is formed integrally with the lower end of the discharge tube means 53' and it is secured by bolts 156 to the upper side of the top wall 154. For sealing purposes a gasket 157 is interposed between the juxtaposed surfaces. At its lower end the discharge tube means 53 is provided with an annular shoulder 158 which is located opposite annular serrations 159 in the upper side of the top wall 154 and close to the opening 153. The annular flange 57 at the lower end of the inner discharge tube 58 is clamped between the downwardly facing surface of the shoulder 158 and the annular serrations 159 when the bolts 156 are tightened. In order to compensate for the lower velocity of the flow of water through the inner discharge tube 58 on rupture of the diaphragm 63, a relatively close fit is provided at 160 between the periphery of the piston 103 and the inner surface of the cylindrical intermediate section 60 of the inner discharge tube 58.

It will be understood that hot water under pressure is applied directly to the under surface of the rupturable diaphragm 63 and that the force exerted thereby is restrained by the strain element means 84 in the manner described hereinbefore.

In the manner previously described, when the pressure applied to the rupturable diaphragm 63 is sufficient, the strain wire 85 is severed and subsequently it is pierced by the diaphragm piercing means 93 to provide a large vent opening through which the water or water vapor can readily escape through the inner discharge tube 58 and flow outwardly through the outer discharge tube 53' to the atmosphere accompanied by removal of the vent cap 108. Suitable baffles can be provided for re-directing the flow of fluid under pressure from the upper end of the outer discharge tube 53'.

What is claimed as new is:

1. Pressure relief means for a housing having a filling of fluid at super-atmosphere pressure, said pressure relief means comprising: a tubular holder mounted on said housing with its inner end communicating with the interior thereof and its outer end communicating with the atmosphere, a rupturable diaphragm closing off the opening through said tubular holder, the inner side of said diaphragm being convex and subject to said fluid pressure and the outer side thereof being concave and subject to atmospheric pressure, rupturable strain element means interposed between the outer end of said tubular holder and said outer side of said diaphragm for restraining eversion thereof until the occurrence of a predetermined pressure against said inner side of said diaphragm sufficient to rupture said strain element means, and diaphragm puncturing means in the form of a plate secured to said inner side of said diaphragm movable with said diaphragm, restrained by said strain element means, and carrying a plurality of cutting sections along its periphery directed toward said inner side whereby on eversion of said diaphragm after the rupture of said strain element means said diaphragm puncturing means is released to move conjointly with said diaphragm and said diaphragm is punctured in a positive manner by said cutting sections.

2. The invention, as set forth in claim 1, wherein: the diaphragm has an intermediate annular section in a plane transverse to the longitudinal axis of the tubular holder, and the plate is substantially square with the cutting sections being formed by the corner portions and the tips of said corner portions registering with the outer periphery of said annular section.

3. The invention, as set forth in claim 1, wherein a piston is secured in spaced relation to the plate on the side away from the diaphragm and extends substantially entirely across the opening through the tubular holder and is in the path of fluid flowing therethrough from the housing.

4. The invention, as set forth in claim 3, wherein, pressure applied by the fluid to the piston forces the plate through the diaphragm, and said piston has a greater area than said plate and is formed of readily collapsible material whereby it can be forced through the aperture cut in said diaphragm by said plate.

5. The invention, as set forth in claim 1, wherein the strain element means includes: bridge means extending transversely of and reacting against the outer end of said tubular holder, strain wire means connected to said outer end of said holder at diametrically opposite locations and overlying said bridge means, and force transmitting means interposed between said bridge means and said diaphragm.

6. The invention, as set forth in claim 5, wherein, anchor members extend inwardly from diametrically opposite sides of the tubular holder at its outer end, the bridge means carries transversely extending end members, and the strain wire means includes loop end portions trained over said end members and extending around said anchor members respectively.

7. The invention, as set forth in claim 6, wherein: the bridge means includes a pair of spaced side plates interconnected by the end members, and an adjusting plate is carried by said side plates intermediate their ends against which the force transmitting means reacts.

8. The invention, as set forth in claim 7, wherein: the force transmitting means includes a pressure plate bearing against the diaphragm, a jack screw threaded into said pressure plate and having a socket head, and a ball in said socket head bearing against the adjusting plate.

9. The invention, as set forth in claim 5, wherein: a discharge tube extends from the housing and is telescoped over the tubular holder, a closure is detachably mounted on the exhaust end of said discharge tube, and a spring is interposed between the bridge means and said closure.

References Cited by the Examiner

UNITED STATES PATENTS

| | | | |
|---|---|---|---|
| 2,098,399 | 11/1937 | Munson | 220—89 |
| 2,304,417 | 12/1942 | Mason | 220—89 |
| 2,505,456 | 4/1950 | Beecher | 220—89 |
| 2,788,794 | 4/1957 | Holinger | 220—89 |
| 3,101,733 | 8/1963 | Lord | 220—47 |
| 3,155,271 | 11/1964 | Summers et al. | 220—89 |

THERON E. CONDON, *Primary Examiner.*

LOUIS G. MANCENE, *Examiner.*

R. H. SCHWARTZ, *Assistant Examiner.*